(12) United States Patent
Tanaka

(10) Patent No.: US 7,072,384 B2
(45) Date of Patent: Jul. 4, 2006

(54) FIXED PATTERN DETECTION APPARATUS AND FIXED PATTERN DETECTION METHOD

(75) Inventor: Hiroki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 773 days.

(21) Appl. No.: 10/292,447

(22) Filed: Nov. 13, 2002

(65) Prior Publication Data

US 2003/0091108 A1    May 15, 2003

(30) Foreign Application Priority Data

Nov. 15, 2001   (JP)   ............................. 2001-349920

(51) Int. Cl.
*H04B 1/69* (2006.01)
(52) U.S. Cl. ...................................... 375/149; 375/150
(58) Field of Classification Search ................ 375/130, 375/140, 142, 145, 147, 149, 150, 340, 343, 375/354, 362–368; 370/335, 342, 441
See application file for complete search history.

(56) References Cited

U.S. PATENT DOCUMENTS

| | | | | |
|---|---|---|---|---|
| 6,535,547 B1 * | 3/2003 | Lyckegård et al. | ......... | 375/145 |
| 6,882,682 B1 * | 4/2005 | Tanaka | ........................ | 375/150 |
| 6,985,517 B1 * | 1/2006 | Matsumoto et al. | ........ | 375/152 |

FOREIGN PATENT DOCUMENTS

| | | |
|---|---|---|
| EP | 1 096 693 A2 | 5/2001 |
| JP | H08-8780 A | 1/1996 |
| JP | 2001-136103 A | 5/2001 |
| JP | 2001-274724 A | 10/2001 |
| JP | 2002-152084 A | 5/2002 |
| WO | WO 00/36761 A2 | 6/2000 |
| WO | WO 00/62436 A1 | 10/2000 |

* cited by examiner

*Primary Examiner*—Tesfaldet Bocure
(74) *Attorney, Agent, or Firm*—Sughrue Mion, PLLC

(57) ABSTRACT

In a fixed pattern detection apparatus, a reception memory temporarily stores received signals. A correlator calculates signature pattern correlation values for respective blocks by product-sum operation based on received signals of the respective blocks obtained by dividing a received signal at a predetermined reference timing out of the received signals stored in the reception memory. An in-phase adder adds, in phase for a plurality of blocks, the in-phase components and quadrature components of the signature pattern correlation values obtained by the correlator. A power value calculation unit calculates individual power values from in-phase addition values obtained by the in-phase adder. An adder sums up the individual power values obtained by the power value calculation unit to calculate a detection power value corresponding to the received signal. A detection determination unit compares the detection power value obtained by the adder with a threshold to determine whether a fixed pattern has been detected. A fixed pattern detection method is also disclosed.

19 Claims, 14 Drawing Sheets

| REPETITIVE COUNT | CORRELATION BANK [k] | CORRELATOR [k] | START MULTIPLICATION OUTPUT | FINAL MULTIPLICATION OUTPUT | DELAY AMOUNT [d] | SIGNATURE PATTERN SYMBOL [p] | CORRELATOR OUTPUT |
|---|---|---|---|---|---|---|---|
| ###0 | ##0 | #0 | $S^*_0 \times C_0$ | $S^*_{N/K-K} \times C_{N/K-K}$ | 0 | 0 | $A_{0,0}$ |
| | | #1 | $S^*_0 \times C_K$ | $S^*_{N/K-K} \times C_{N/K}$ | K | 0 | $A_{K,0}$ |
| | | #2 | $S^*_0 \times C_{2K}$ | $S^*_{N/K-K} \times C_{N/K+K}$ | 2K | 0 | $A_{2K,0}$ |
| | | ⋮ | | | | | |
| | | #L/K-1 | $S^*_0 \times C_{L-K}$ | $S^*_{N/K-K} \times C_{N/K}$ | L-K | 0 | $A_{L-K,0}$ |
| | ##1 | #0 | $S^*_1 \times C_K$ | $S^*_{N/K-K+1} \times C_{N/K}$ | K-1 | 1 | $A_{K-1,1}$ |
| | | ⋮ | | | | | |
| | | #L/K-1 | $S^*_1 \times C_L$ | $S^*_{N/K-K+1} \times C_{N/K+L-K}$ | L-1 | 1 | $A_{L-1,1}$ |
| | ⋮ | | | | | | |
| | ##K-1 | #0 | $S^*_{K-1} \times C_K$ | $S^*_{N/K-1} \times C_{N/K}$ | 1 | K-1 | $A_{1,K-1}$ |
| | | ⋮ | | | | | |
| | | #L/K-1 | $S^*_{K-1} \times C_L$ | $S^*_{N/K-1} \times C_{N/K+L-K}$ | L-K+1 | K-1 | $A_{L-K+1,K-1}$ |
| ###1 | ##0 | #0 | $S^*_1 \times C_K$ | $S^*_{N/K-K} \times C_{N/K}$ | 1 | 0 | $A_{K-1,0}$ |
| | | ⋮ | | | | | |
| | | #L/K-1 | $S^*_1 \times C_L$ | $S^*_{N/K-K} \times C_{N/K+L-K}$ | L-K+1 | 0 | $A_{L-1,0}$ |
| | ⋮ | | | | | | |
| | ##K-1 | #0 | $S^*_1 \times C_K$ | $S^*_{N/K-K+1} \times C_{N/K}$ | 2 | K-1 | $A_{K-1,K-1}$ |
| | | ⋮ | | | | | |
| | | #L/K-1 | $S^*_1 \times C_L$ | $S^*_{N/K-K+1} \times C_{N/K+L-K}$ | L-K+2 | K-1 | $A_{L-1,K-1}$ |
| ⋮ | | | | | | | |
| ###K-1 | ##0 | #0 | $S^*_0 \times C_{K-1}$ | $S^*_{N/K-K} \times C_{N/K+1}$ | K-1 | 0 | $A_{K-1,0}$ |
| | | #1 | $S^*_0 \times C_{2K-1}$ | $S^*_{N/K-K} \times C_{N/K+K+1}$ | 2K-1 | 0 | $A_{2K-1,0}$ |
| | | ⋮ | | | | | |
| | | #L/K-1 | $S^*_0 \times C_{L-1}$ | $S^*_{N/K-K} \times C_{N/K+L-K+1}$ | L-1 | 0 | $A_{L-1,0}$ |
| | ⋮ | | | | | | |
| | ##K-1 | #0 | $S^*_{K-1} \times C_{K-1}$ | $S^*_{N/K-1} \times C_{N/K-1}$ | 0 | K-1 | $A_{0,K-1}$ |
| | | ⋮ | | | | | |
| | | #L/K-1 | $S^*_{K-1} \times C_{L-1}$ | $S^*_{N/K-1} \times C_{N/K+L-K-1}$ | L-K | K-1 | $A_{L-K,K-1}$ |

FIG. 9

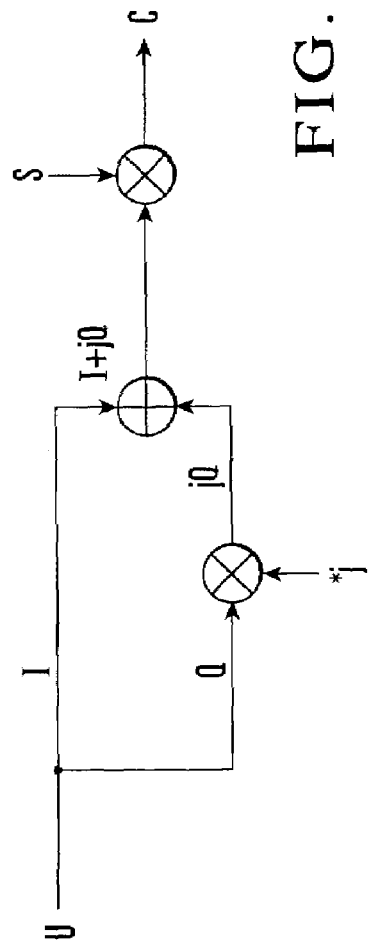

US 7,072,384 B2

FIXED PATTERN DETECTION APPARATUS AND FIXED PATTERN DETECTION METHOD

BACKGROUND OF THE INVENTION

The present invention relates to a fixed pattern detection apparatus and fixed pattern detection method which detect a fixed pattern for establishing timing synchronization with a spreading code contained in a received signal in a CDMA (Code Division Multiple Access) communication type reception apparatus.

In the communication field, a fixed signal pattern is generally inserted into a signal on the transmitting side, and the correlation is calculated on the receiving side for the purpose of detection of a received signal and timing synchronization. In broadband CDMA excepted as a next-generation cell phone standard, signals obtained by spreading desired information by a user-specific spreading code are superposed and transmitted in the same frequency band. The signals are despread using a user-specific spreading code prepared on the receiving side, thereby extracting the original desired information from the received signals. Despreading must be synchronized with the spread spectrum timing, in other words, synchronization acquisition must be performed.

In synchronization acquisition, the transmitting side transmits a predetermined fixed pattern, and the receiving side calculates a correlation value between a received signal and the fixed pattern to detect synchronization. For example, in broadband CDMA, a mobile station accesses the base station of a handover destination cell by using a common control channel on the basis of information (transmission timing, spreading code, signature, or the like) notified by a BCH (Broadcast CHannel) received from the base station in soft handover.

A mobile communication system standard by the standardization project 3GPP (3rd Generation Partnership Project) for 3rd generation mobile communication systems defines PRACH (Physical Random Access CHannel) as a physical channel used at this time.

The PRACH has a 4096-chip long preamble field as a fixed pattern for spreading code synchronization detection. The mobile station arbitrarily selects one of 16 preset types of preamble signatures (16-chip length), and uses the selected signature repetitively 256 times. The mobile station executes complex spreading by a scrambling code notified by the base station, generating a preamble field.

The broadband CDMA system requires a very long fixed pattern because of a very low S/N ratio upon chip-rate conversion. The presence of the frequency drift degrades the reception characteristic to a non-negligible degree. In general, such a fixed pattern must be detected within a predetermined time in the fading environment, and a detection characteristic is also required. From this, demands have arisen for a fixed pattern detection apparatus which improves the detection characteristic on the premise that the hardware scale, cost, and power consumption are reduced and the restriction on the processing time is met.

The present inventor has proposed a fixed pattern detection apparatus disclosed in Japanese Patent Laid-Open No. 2001-136103 (reference 1) in order to shorten the fixed pattern detection processing time and reduce the circuit scale. FIG. 13 shows the fixed pattern detection apparatus proposed in reference 1. The conventional fixed pattern detection apparatus detects a fixed pattern C generated by spreading as shown in FIGS. 14A and 14B. The fixed pattern C is formed from a symbol sequence $C_0, C_1, \ldots, C_{N-1}$ having a code length of N chips (N is an integer of 2 or more). The fixed pattern C is generated by spreading each symbol of a signature pattern U by a spreading code S.

As shown in FIG. 14A, the signature pattern U used to generate the fixed pattern C is constituted by repeating a symbol sequence $U_0, U_1, \ldots, U_{K-1}$ having a length of K chips (K is an integer of 2 or more) M times (M is an integer of 2 or more) (K×M=N). The spreading code S is formed from an arbitrary N-chip long symbol sequence $S_0, S_1, \ldots, S_{N-1}$. In the fixed pattern C, each of the symbols $U_0, U_1, \ldots,$ and $U_{K-1}$ Of the signature pattern U is spread to M symbols by the spreading code S.

In the 3GPP PRACH, the spreading code S corresponds to a scrambling code from the base station. The signature pattern U corresponds to one of 16 types of preamble signatures (K=16-chip length) registered in the mobile station in advance. As shown in FIG. 14B, the signature pattern U is repeated M=256 times and used as an I component (in-phase component) and Q component (quadrature component). The Q component is converted into an imaginary number j, and the imaginary number j is complex-spread by a corresponding spreading code S to generate a fixed pattern C.

The conventional fixed pattern detection apparatus detects a desired fixed pattern by performing despreading for a received signal in an order reverse to spreading. In FIG. 13, received signals 81A containing a fixed pattern are temporarily accumulated in a received signal memory 81, and sequentially read out as received signals C under the control of a received signal memory controller 82. The correlation between each received signal C and the spreading code S is calculated by a spreading code correlator 83.

At this time, spreading code sequences having a length N from a spreading code generator 84 are thinned out and rearranged every K chips. M spreading code sequences are supplied to the spreading code correlator 83 via a spreading code shift register 85. The spreading code correlator 83 calculates the correlations between the M spreading code sequences and M received signals C every K chips, calculates spreading code correlation values corresponding to K signature pattern symbols, and stores the correlation values in a correlation value memory 86. Received signals are read out from positions delayed by one chip from the received signal memory 81. The spreading code correlator 83 calculates spreading code correlation values A for a period of N+L chips including an indefinite time width of L chips.

Spreading code correlation values corresponding to K signature pattern symbols at the same delay position are read out from the correlation value memory 86 under the control of a correlation value memory controller 87. A signature pattern correlator 88 calculates the correlations between the spreading code correlation values and a signature pattern prepared in advance in a signature pattern table 89. A signature detector 90 selects a preferable correlation value from signature pattern correlation values obtained in correspondence with respective delay positions, and outputs the selected correlation value as a detection result 90A.

A spreading code correlation value is calculated by the spreading code correlator 83 shorter than the N-chip fixed pattern length. A final signature pattern correlation value is calculated by the signature pattern correlator 88. The processing time for calculating a desired correlation value is shortened.

When a plurality of signature patterns exist, the spreading code correlator 83 is shared between them, and a signature pattern correlator 88 constituted by parallel-arranging separate correlators corresponding to types of signature patterns is used. Whether a signature pattern has been detected can be simultaneously confirmed for a plurality of types of signature patterns. In this case, the circuit scale is reduced in comparison with a conventional arrangement using a plurality of correlators with a K×M-chip length in correspondence with signature patterns.

The conventional fixed pattern detection apparatus can be expected to shorten the processing time for calculating a correlation value and reduce the circuit scale. However, the conventional apparatus calculates correlation products at once for an N-chip fixed pattern length. If the frequency drift exists in a received signal, the reception characteristic degrades as the number of chips subjected to simultaneous correlation product calculation is larger.

If the frequency drift exists in a received signal, the phase of the received signal may be inverted at a low frequency corresponding to the frequency difference. When the number of chips subjected to simultaneous correlation product calculation is large and a received signal undergoes arithmetic processing for a relatively long period, a received signal influenced by phase inversion may be used at high probability. A good correlation cannot be obtained, resulting in a poor reception characteristic.

SUMMARY OF THE INVENTION

It is an object of the present invention to provide a fixed pattern detection apparatus and fixed pattern detection method capable of suppressing degradation of the fixed pattern detection characteristic even when the frequency drift exists in a received signal.

To achieve the above object, according to the present invention, there is provided a fixed pattern detection apparatus which is used in a CDMA communication radio reception apparatus, and detects from a received signal a fixed pattern generated by spreading by a spreading code an in-phase component and a quadrature component of a pattern obtained by repeating a signature pattern formed from a plurality of symbols, comprising a reception memory which temporarily stores received signals, correlation means for calculating signature pattern correlation values for respective blocks by product-sum operation based on received signals of the respective blocks obtained by dividing a received signal at a predetermined reference timing out of the received signals stored in the reception memory, in-phase addition means for adding, in phase for a plurality of blocks, in-phase components and quadrature components of the signature pattern correlation values obtained by the correlation means, power value calculation means for calculating individual power values from in-phase addition values obtained by the in-phase addition means, addition means for summing up the individual power values obtained by the power value calculation means to calculate a detection power value corresponding to the received signal, and detection determination means for comparing the detection power value obtained by the addition means with a threshold to determine whether a fixed pattern has been detected.

BRIEF DESCRIPTION OF THE DRAWINGS

FIG. 9 is a table for explaining spreading code correlation values calculated by each correlation bank and correlator shown in FIG. 7;

FIGS. 14A and 14B are views for explaining a fixed pattern contained in a received signal.

DESCRIPTION OF THE PREFERRED EMBODIMENT

The present invention will be described in detail below with reference to the accompanying drawings.

Figure 1:
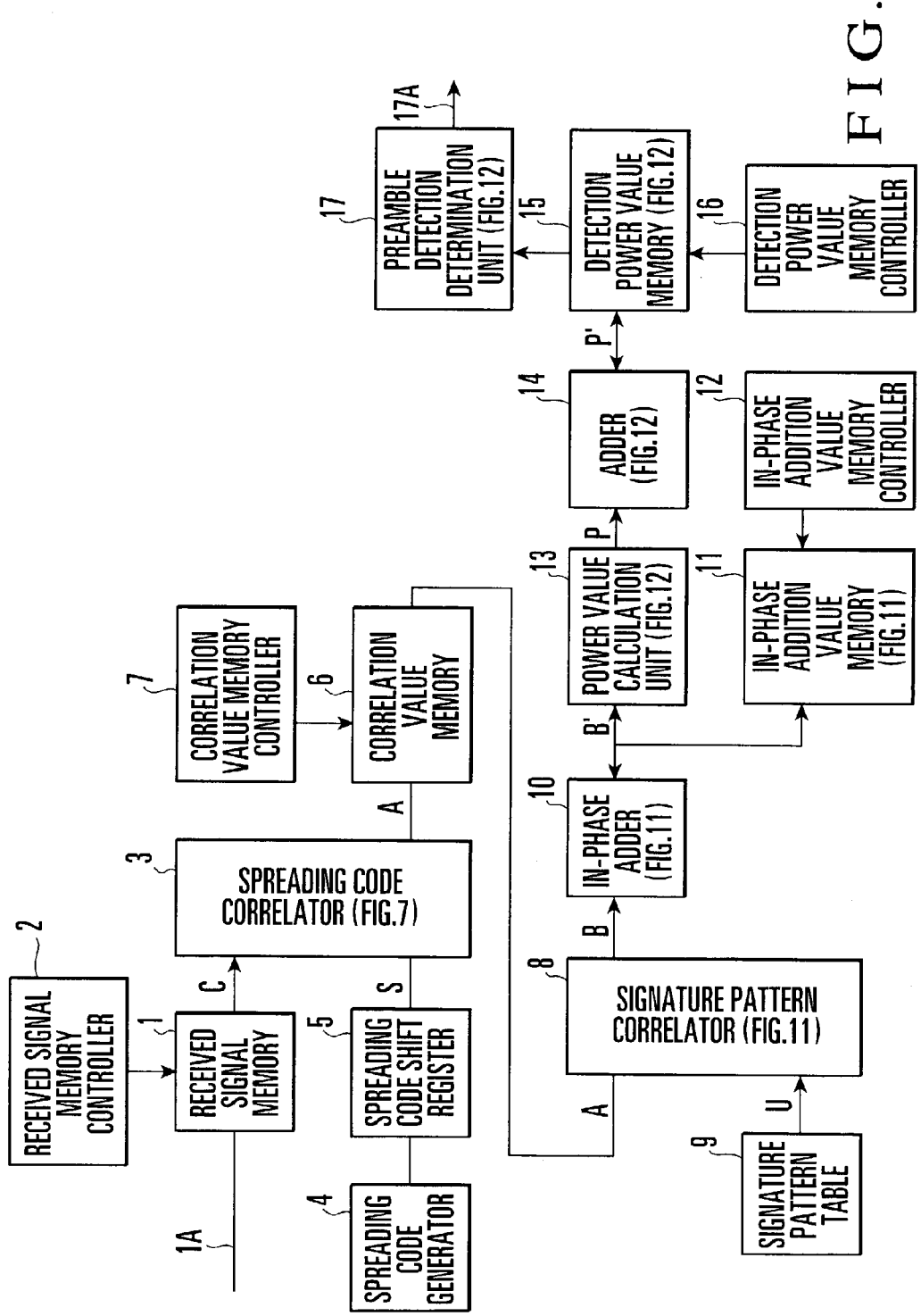
FIG. 1 is a block diagram showing a fixed pattern detection apparatus according to an embodiment of the present invention.

FIG. 1 shows a fixed pattern detection apparatus according to an embodiment of the present invention. In the following description, the above-mentioned PRACH (Physical Random Access CHannel) preamble signal shown in FIG. 14A that is defined by the mobile communication system standard by the 3rd generation mobile communication system standardization project 3GPP is detected as a fixed pattern C.

The fixed pattern detection apparatus shown in FIG. 1 comprises a received signal memory 1 to which a received signal 1A is input, a received signal memory controller 2 and spreading code correlator 3 which are connected to the received signal memory 1, a spreading code generator 4, spreading code shift registers 5 connected between the spreading code correlator 3 and the spreading code generator 4, a correlation value memory 6 connected to the spreading code correlator 3, a correlation value memory controller 7 and signature pattern correlator 8 which are connected to the correlation value memory 6, a signature pattern table 9 and in-phase adders 10 which are connected to the signature pattern correlator 8, in-phase addition value memories 11 connected to the in-phase adders 10, an in-phase addition value memory controller 12 connected to the in-phase addition value memories 11, power value calculation units 13 connected to the in-phase adders 10, adders 14 connected to the power value calculation units 13, detection power value memories 15 connected to the adders 14, a detection power value memory controller 16 connected to the detection power value memories 15, and preamble detection determination units 17 which are connected to the detection power value memories 15 and output detection results 17A.

The received signal memory 1 temporarily stores the signal 1A received by a CDMA reception apparatus. The received signal memory controller 2 writes the received signal 1A in the received signal memory 1, and reads out a received signal (received data) C from the received signal memory 1 on the basis of a predetermined order. The spreading code generator 4 generates the same spreading code (despreading code) S as a spreading code used in spreading in transmitting a preamble signal. The spreading code shift registers 5 hold respective bits of the spreading code from the spreading code generator 4, and sequentially output the bits to the spreading code correlator 3 while giving them a predetermined delay.

For respective blocks obtained by dividing a received signal stored in the received signal memory 1, the spreading code correlator 3 calculates the sum of products of received signals C of the blocks and spreading codes S corresponding to the blocks from the spreading code shift registers 5, calculating spreading code correlation values A for the respective blocks. The correlation value memory 6 is a memory circuit which temporarily stores the spreading code correlation values A of the blocks obtained by the spreading code correlator 3. Write/read of the spreading code correlation values A in/from the correlation value memory 6 is controlled.

The signature pattern table 9 stores in advance a plurality of types of signature patterns U used to generate a preamble signal. The signature pattern correlator 8 calculates the sum of products of the spreading code correlation values A of the respective blocks read out from the correlation value memory 6 and signature patterns U read out from the signature pattern table, calculating signature pattern correlation values B for the respective signature patterns corresponding to the blocks.

The in-phase adders 10 adds the signature pattern correlation values B of the blocks obtained by the signature pattern correlator 8 to I components (in-phase components) and Q components (quadrature components) for the respective signature patterns, calculating in-phase addition values B'. The in-phase addition value memories 11 temporarily store the in-phase addition values B' obtained by the in-phase adders 10. The in-phase addition value memory controller 12 controls write/read of the in-phase addition values B' in/from the in-phase addition value memories 11.

The power value calculation units 13 calculate individual power values P for the respective in-phase addition values B' from the in-phase addition values B' obtained by the in-phase adders 10. The adders 14 add the individual power values P of all the blocks obtained by the power value calculation units 13 for the respective signature patterns, calculating detection power values P' for the respective signature patterns. The detection power value memories 15 temporarily store the detection power values P' obtained by the adders 14. The detection power value memory controller 16 controls write/read of the detection power values P' in/from the detection power value memories 15.

The preamble detection determination units 17 detect maximum values from detection power values P' stored in the detection power value memories 15 for the respective signature patterns. The preamble detection determination units 17 compare the maximum values with a predetermined threshold to determine whether fixed patterns have been detected for the respective signature patterns.

The operation of the fixed pattern detection apparatus having this arrangement will be explained.

A received signal processed by the fixed pattern detection apparatus contains a signal in which noise is added to a fixed pattern Cn (n is an integer of 0 to N−1) having a code length N (N is an integer of 2 or more) shown in FIG. 14A. The fixed pattern C, signature pattern U, and spreading code S have structures shown in FIG. 14A.

Letting Un be each symbol of the signature pattern (Un=0 at n<0, n?K), and Sn be each symbol of the spreading code, each symbol Cn of the fixed pattern is given by $$C_n = S_n \cdot \sum_{i=0}^{M} U_{(n-K \times i)} \quad (1)$$

For example, in PRACH, the spreading code S corresponds to a scrambling code from the base station. The signature pattern U corresponds to one of 16 preamble signatures (K=16-chip length) of the mobile station. The signature pattern U is repeated M=256 times, and used as I and Q components. The Q component is converted into an imaginary number j, and the imaginary number j is complex-spread by a corresponding spreading code S to generate a fixed pattern C.

The fixed pattern detection apparatus of this embodiment calculates a desired spreading code correlation value by performing despreading using two correlators as shown in FIG. 1 for a spread fixed pattern. Fixed pattern detection operation will be explained with reference to FIGS. 2 and 3.

Figure 2:
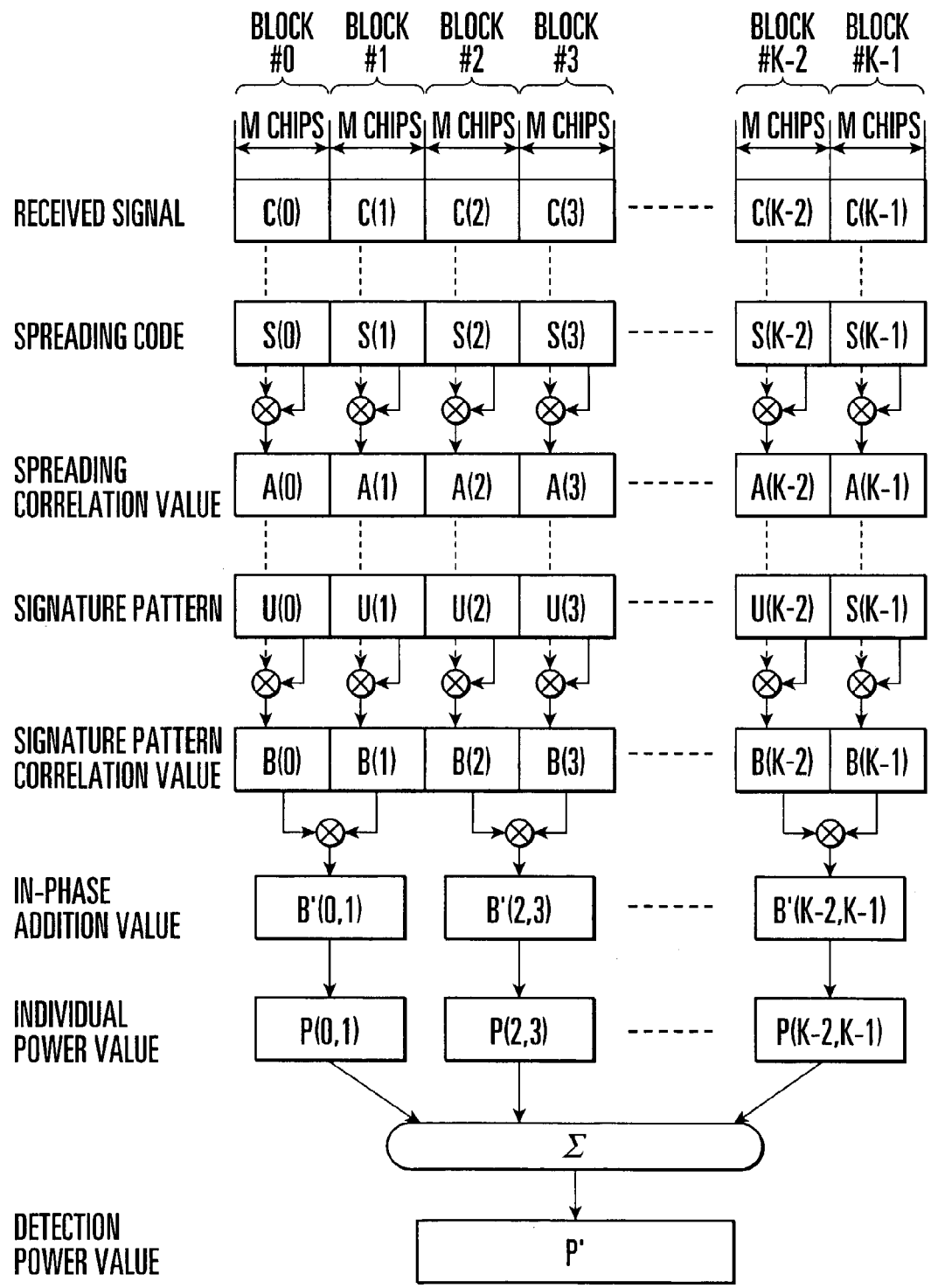
FIG. 2 is a view for explaining processing operation of the fixed pattern detection apparatus shown in FIG. 1.
Figure 3:
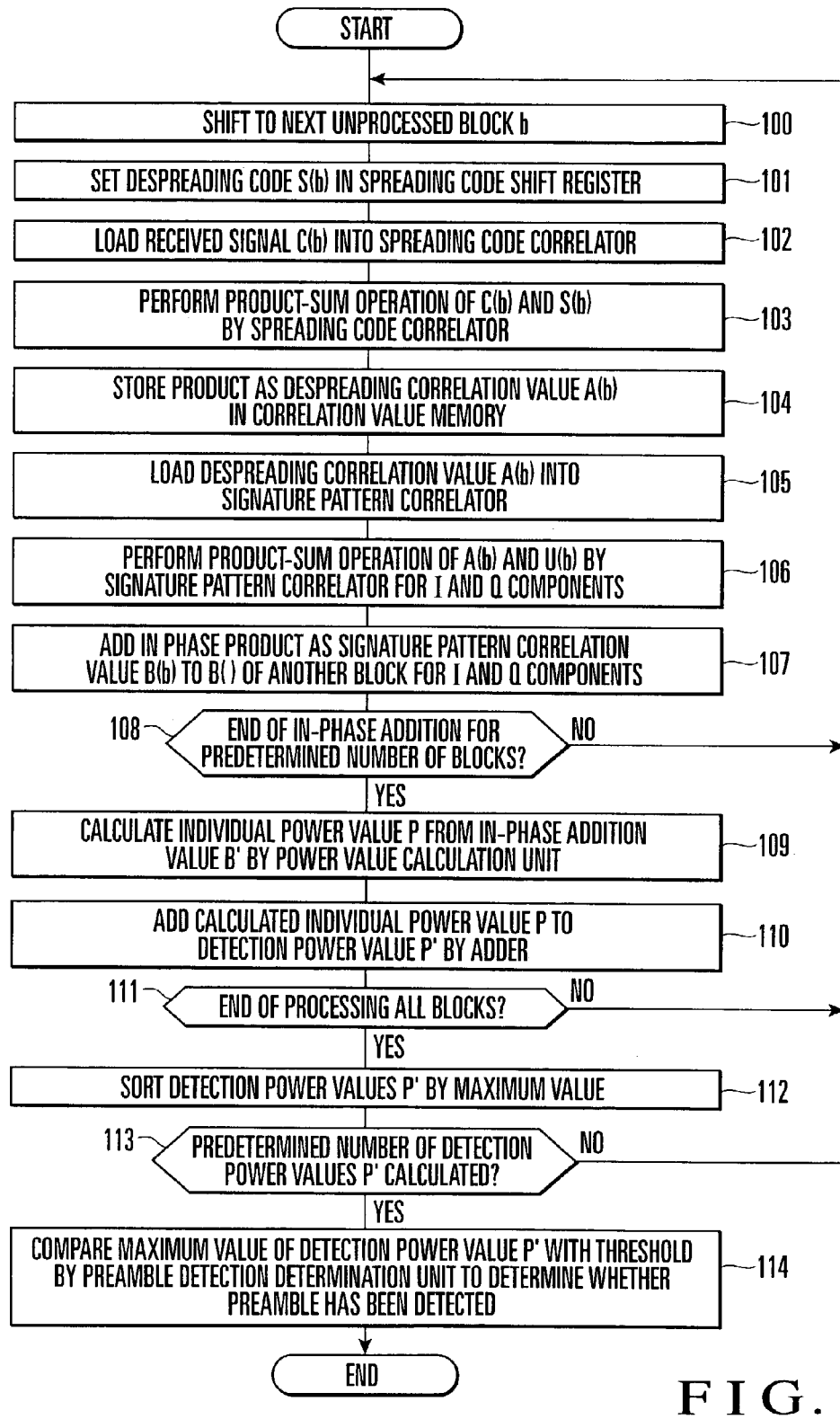
FIG. 3 is a flow chart showing pattern detection operation of the fixed pattern detection apparatus shown in FIG. 1.

The fixed pattern detection apparatus of this embodiment divides a received signal C into a plurality of blocks, and executes despreading every block. As shown in FIG. 2, the entire received signal C (N-chip length) is divided into K M-chip long blocks C(0) to C(K−1). As shown in FIG. 3, attention is given to the first block 0 (b=0) from the reference timing as an unprocessed block (step S100). A spreading code S(0) corresponding to the block is set in the spreading code shift register 5 (step S101).

The received signal memory controller 2 loads the received signal C(0) of block #0 from the received signal memory 1 into the spreading code correlator 3 (step S102). The spreading code correlator 3 performs product-sum operation of the received signal C(0) and spreading code S(0) (step S103). The product-sum result is stored as a despreading correlation value A(0) of block #0 in the correlation value memory 6 (step S104).

The correlation value memory controller 7 loads the obtained despreading correlation value A(0) of block #0 into the signature pattern correlator 8 (step S105). The signature pattern correlator 8 performs product-sum operation of the despreading correlation value A(0) and a signature pattern U(0) corresponding to block #0 from the signature pattern table 9 (step S106). At this time, product-sum operation is done for I and Q components.

The in-phase adder 10 adds in phase the product-sum result obtained by the signature pattern correlator 8 as a signature pattern correlation value B(0) to the in-phase addition value B' in the in-phase addition value memory 11 for I and Q components (step S107). Whether in-phase addition has been done for a predetermined number of blocks is checked (step S108). If the addition count does not reach the predetermined number of blocks (step S108: NO), the flow returns to step S100 and shifts to the next block #1 (b=1).

If the signature pattern correlation value B(1) of block #1 is added in phase and the addition count reaches the predetermined number of blocks #=2 (step S108: YES), the in-phase addition value memory controller 12 loads an in-phase addition value B'(0,1) from the in-phase addition value memory 11 into the power value calculation unit 13.

The power value calculation unit 13 calculates a corresponding individual power value P(0,1) $I_2+Q_2$ on the basis of the loaded in-phase addition value B'(0,1) (step S109). The adder 14 adds the individual power value P(0,1) to a detection power value P' stored in the detection power value memory 15 (step S110).

In this manner, a signature pattern correlation value B is calculated every block. Signature pattern correlation values B are added in phase every predetermined number of blocks # to obtain an individual power value P. Individual power values P are sequentially added to the detection power value P'. When processing for all the blocks ends (step S111: YES), the detection power value P' of the received signal is obtained.

In practice, a round-trip delay time corresponding to the distance between base and mobile stations exists in communication between them. The detection power value P' may be calculated by shifting a received signal and spreading code by one chip with an indefinite time width which is a range from the reference timing of the base station to a timing delayed by the round-trip delay time.

The mobile station can select any of a plurality of signature patterns. On the base station, detection power values P' may be parallel-calculated based on correlation values with the respective signature patterns. When a received signal is sampled at a smaller interval within one chip period, despreading may be performed every sampling position to calculate a detection power value P'.

The detection power value memory controller 16 selects a maximum value from a plurality of detection power values P' obtained in the above way, and outputs the maximum value to the preamble detection determination unit 17 (step S112). Processing from steps S100 to S112 is repetitively executed until a predetermined number of detection power values P' or more are obtained. If the predetermined number of detection power values P' or more are obtained (step S113: YES), the preamble detection determination unit 17 compares the maximum value of the detection power value P' output from the detection power value memory 15 with a threshold. If the maximum value exceeds the threshold, the preamble detection determination unit 17 determines that a signature pattern has been detected, and outputs the detection result 17A (step S114).

In this embodiment, a received signal is divided into a plurality of blocks. The received signals of the respective blocks undergo product-sum operation using spreading codes by the spreading code correlator 3 to obtain spreading code correlation values. The obtained spreading code correlation values undergo product-sum operation using signature patterns by the signature pattern correlator 8. Signature pattern correlation values obtained for respective blocks are added in phase by the in-phase adders 10 every plurality of blocks #. Individual power values are calculated by the power value calculation units 13 from in-phase addition values obtained from the signature pattern correlation values. The individual power values are summed up into a desired detection power value.

The received signal is hardly influenced by phase inversion caused by the frequency drift of the received signal, compared to a case where correlation products undergo despreading at once for an N-chip fixed pattern length. Degradation of the reception characteristic can be suppressed, and a fixed pattern can be stably detected.

Figure 4A:
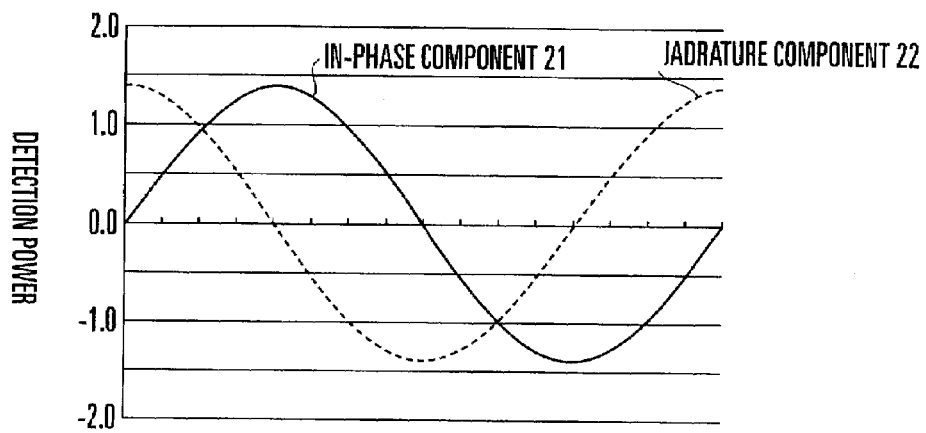
FIG. 4A is a waveform chart showing the frequency drift.
Figure 4B:
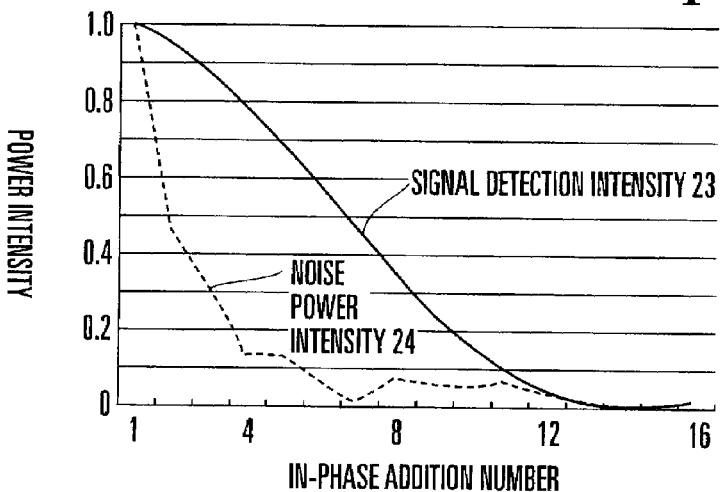
FIG. 4B is a graph showing the relationship between the signal detection intensity and the noise power intensity as a function of the in-phase addition number.
Figure 4C:
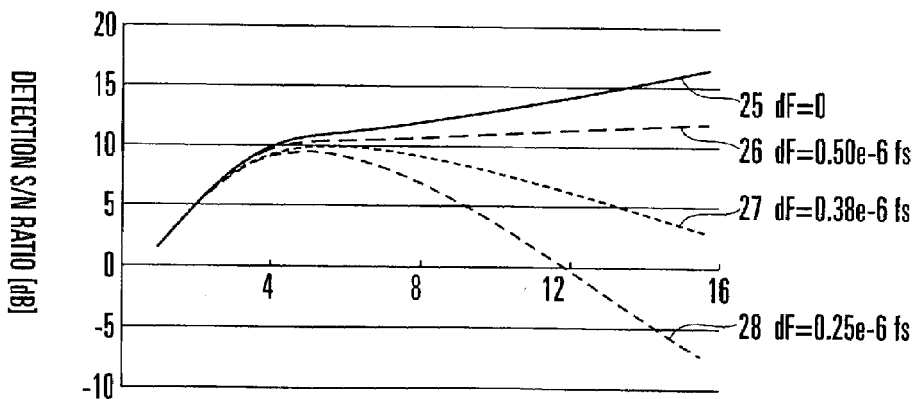
FIG. 4C is a graph showing changes in detection S/N ratio as a function of the in-phase addition number.

The in-phase addition effect on the frequency drift will be described with reference to FIGS. 4A to 4C. When a transmission signal prepared by spreading a signal representing a predetermined value of 1.0 is received and despread, the original value of 1.0 can be obtained in the absence of the frequency drift of the received signal. In the presence of the frequency drift of the received signal, however, an in-phase component (real part of the complex) 21 and a quadrature component (imaginary part of the complex) 22 after despreading appear as sine and cosine waves, as shown in FIG. 4A.

The in-phase component 21 and quadrature component 22 after despreading are integrated for a predetermined interval. That is, in-phase addition is executed for a plurality of blocks to calculate a detection power value. Consequently, the predetermined value can be obtained due to the nature of the trigonometric functions of the in-phase component 21 and quadrature component 22. The detection power value obtained every in-phase addition count is normalized by the in-phase addition count. As the integral interval becomes larger, the average power value, i.e., a signal detection intensity 23 per block reduces, as shown in FIG. 4B. A random noise component contained in the in-phase component 21 or quadrature component 22, i.e., a noise power intensity 24 also reduces.

At this time, the signal detection intensity and noise power intensity have different reduction characteristics. As the ratio between the signal detection intensity and the noise power intensity, i.e., the detection S/N ratio becomes larger, the fixed pattern detection characteristic becomes better. The detection S/N ratio changes depending on a shift amount dF of the frequency drift of the received signal, as shown in FIG. 4C. For example, a characteristic 25 for dF=0 (no shift) and a characteristic 26 for dF=0.25e–6·fs (fs=carrier frequency) exhibit higher detection S/N ratios for a larger in-phase addition count. However, a characteristic 27 for dF=0.38e–6·fs and a characteristic 28 for dF=0.50e–6·fs decrease the detection S/N ratio when the in-phase addition count exceeds a given value.

From this, a model such as the propagation environment between base and mobile stations and the moving speed of the mobile station is assumed in consideration of the tradeoff, and the in-phase count is selected on the basis of the assumed model. Alternatively, signature pattern correlation values obtained for respective blocks may be held in the in-phase addition value memories 11, an individual power value and detection power value may be calculated while the in-phase addition count is changed within a predetermined range, and the individual power value and detection power value may be stored in the detection power value memory 15 as candidates to be selected by the preamble detection determination unit 17.

Despreading considering an indefinite period will be described with reference to FIG. 5. A round-trip delay time corresponding to the distance between base and mobile stations exists in communication between them. If the reference timing of the start of detection is known in detecting a fixed pattern from the mobile station by the base station, the fixed pattern is detected within an indefinite period which is a range from the reference timing of the base station to a timing delayed by the round-trip delay time. In this case, the time when the fixed pattern is to be received suffices to be obtained in advance within a given range. A detection interval L (L is an integer of 2 or more which is divisible by K) expresses the detection timing range, i.e., indefinite time width by chips.

Figure 5:
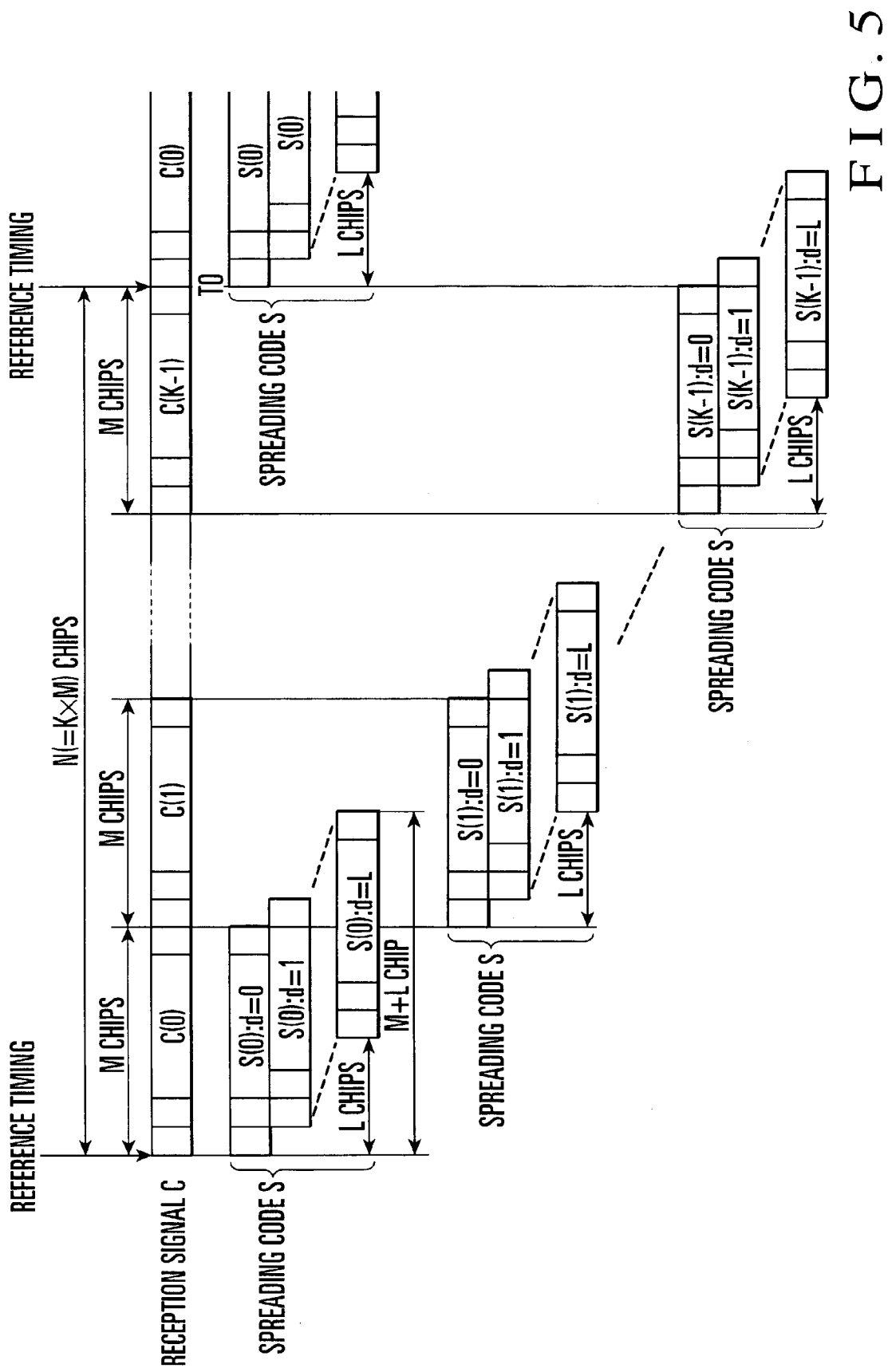
FIG. 5 is a timing chart showing despreading considering an indefinite period.

Considering a received signal delay amount d, the spreading code correlator 3 calculates a spreading code correlation value A every delay amount d set by chips for a received signal of a block, as shown in FIG. 5. For example, the received signal C(0) of the first block and the spreading code S(0) corresponding to the received signal C(0) undergo product-sum operation at the same timing, i.e., the delay amount d=0 in synchronism with the reference timing of the base station. Subsequently, product-sum operation is done with the delay amount=1. Spreading code correlation values A are calculated while the processing start timing is shifted by one chip up to the delay amount d=L.

For the next block, the received signal C(1) and the spreading code S(1) corresponding to the received signal C(1) undergo product-sum operation to calculate a spreading code correlation value A while the processing start timing is shifted by one chip from the delay amount d=0 to d=L. This processing is repetitively executed up to the received signal C(K-1) of the final block. After that, processing starts for a new received signal C(0) of the first block in synchronism with a new reference timing.

Figure 6:
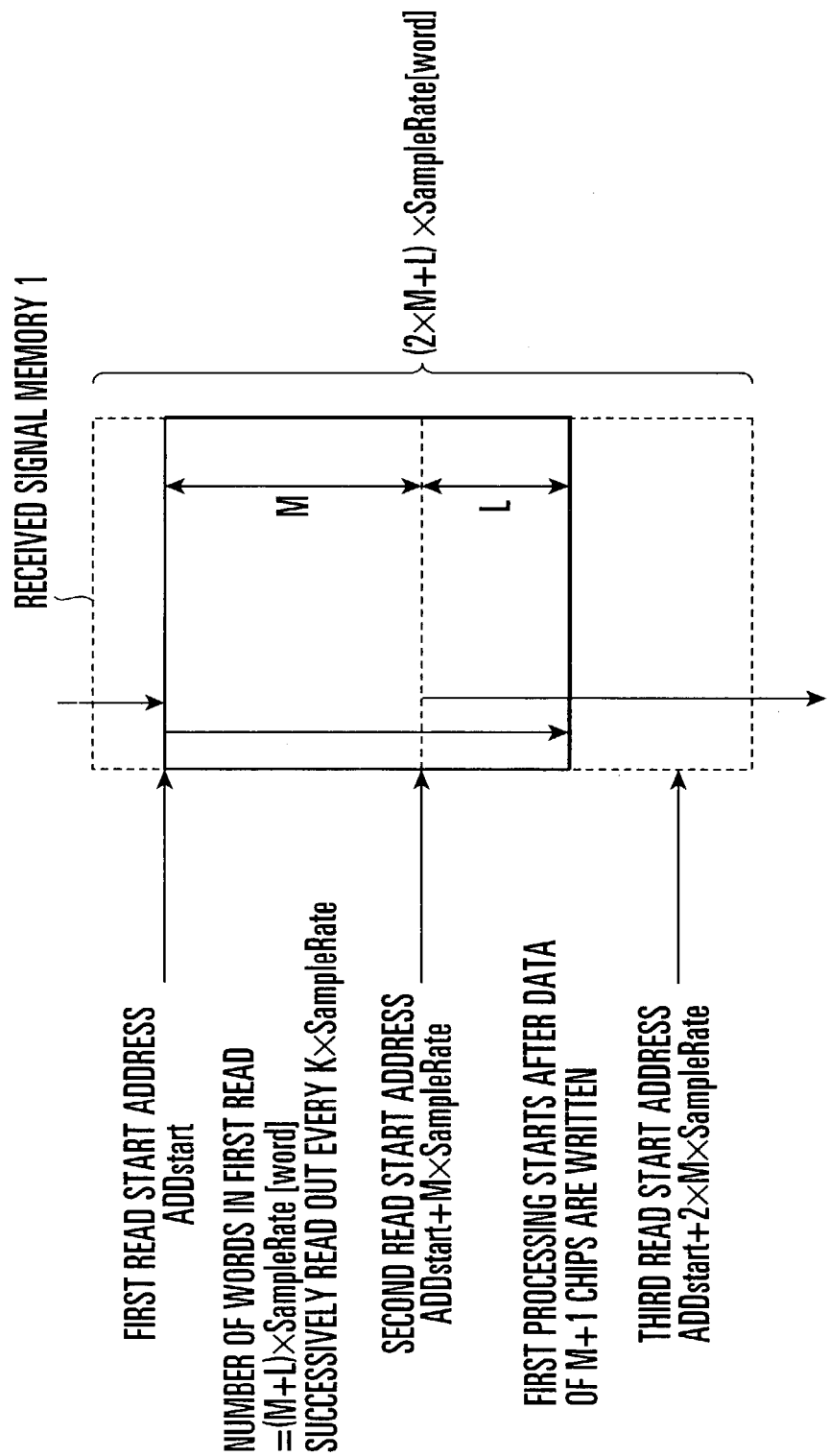
FIG. 6 is a view for explaining control operation of a received signal memory.

The estimated reception time of the received signal 1A has an infinite time width corresponding to an interval of L chips, as described above. As shown in FIG. 6, signals for M chips subjected to simultaneous correlation calculation+L chips of the indefinite time width are accumulated in the received signal memory 1, and then arithmetic processing starts. Spreading codes generated and rearranged in advance by the spreading code generator 4 are stored in the spreading code shift registers 5 corresponding to the signature pattern length K. After the received signals 1A are accumulated, the received signal memory controller 2 generates a read address so as to read out the accumulated received signals in a desired rearrangement order. An offset is added to the read start address so as to attain received data at the detection start timing.

After correlation calculation for M/K chips ends every signature symbol at the detection interval L, the read start address is set to an address prepared by adding M chips to the previous start address. When the received signal is sampled a plurality of number of times per chip, i.e., undergoes oversampling, the sampling count is also taken into consideration. If data of M+L chips to be processed at once can be processed within the accumulation time, the accumulation time is shortened in comparison with no divisional processing, and the processing delay time is reduced.

The accumulation data capacity used for detection processing every symbol corresponds to M+L chips. The next calculation also utilizes data of L chips which is the second half of previously used data, and thus data of L chips are held. The minimum memory capacity of the received signal memory 1 is, therefore, a capacity for holding data for a time of 2M+L chips. The memory capacity can be greatly reduced, compared to the prior art in which at least data corresponding to an N-chip fixed pattern length must be held.

Figure 7:
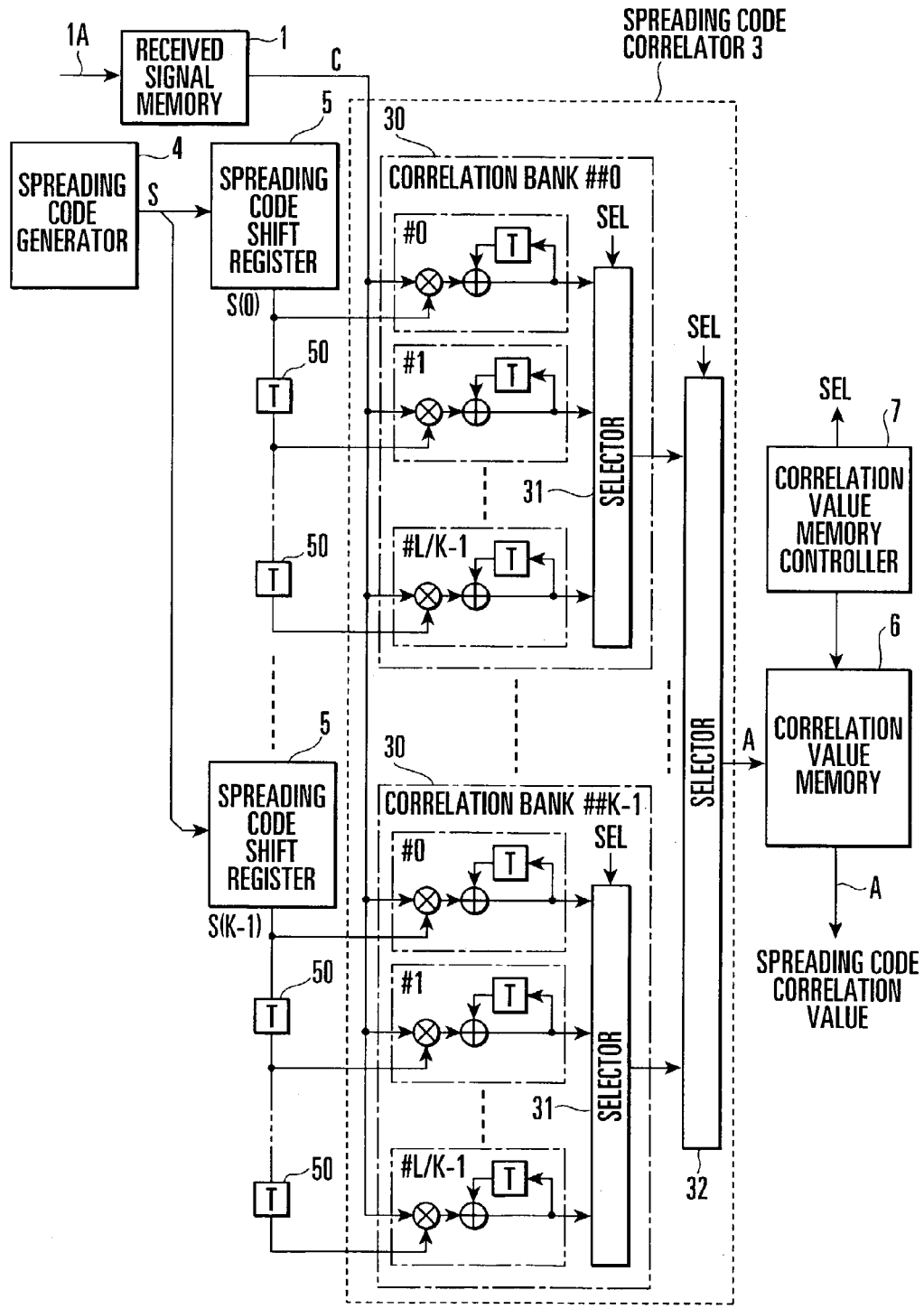
FIG. 7 is a block diagram showing a spreading code correlator shown in FIG. 1.

The spreading code correlator 3 will be explained in detail with reference to FIG. 7. The spreading code correlator 3 comprises K correlation banks (##0 to ##K-1) 30, and a selector 32 which selects one of correlation values obtained by the correlation banks ##0 to ##K-1 and outputs the selected correlation value as the spreading code correlation value A to the correlation value memory 6. Each of the correlation banks ##0 to ##K-1 comprises L/K correlators #0 to #L/K-1, and a selector 31 which selects and outputs one of correlation values obtained by the correlators.

The correlation banks ##0 to ##K-1 are sequentially assigned symbols $U_0, U_1, \ldots, U_{K-1}$ (P=0 to K-1) of a signature pattern. A spreading code correlation value A is calculated for a corresponding symbol $U_p$. The spreading code shift registers (#00 to #K-1) 5 arranged for the respective correlation banks ##0 to ##K-1 supply spreading codes S to the correlators #0 to #L/K-1 of the correlation banks. The spreading codes S are read out every K chips in order of spreading codes $S_0, S_1, \ldots,$ and $S_{N-1}$ in correspondence with the symbols $U_0, U_1, \ldots, U_{K-1}$. The correlators #0 to #L/K-1 calculate spreading code correlation values $A_{d,p}$ having respective delay amounts d for the signature pattern symbol $U_p$ of each correlation bank.

Despreading by the spreading code correlator 3 will be explained with reference to FIG. 8. Spreading codes S from the spreading code generator 4 are set in the spreading code shift registers ##0 to ##K-1 (step S120). The received signal C of one chip is read out from the received signal memory 1 every 16 chips, and parallel-loaded to the correlators #0 to #L/K-1 of each correlation bank (step S121). The correlators #0 to #L/K-1 perform product-sum operation of the received signal C and the spreading code S for respective signature pattern symbols $U_p$ and respective delay amounts d (step S122).

Whether a correlator which has ended product-sum operation exists is checked (step S123). If no correlator which has ended product-sum operation exists, the flow returns to step S121 to load the next received signal C. If a correlator which has ended product-sum operation exists, the product-sum result of the correlator is read out by controlling the selectors 31 and 32, and stored as a spreading code correlation value $A_{d,p}$ in the correlation value memory 6 (step S124). Whether all correlators have ended product-sum operation is checked (step S125). If NO in step S125, the spreading codes S are shifted by one chip by the spreading code shift registers ##0 to ##K-1 (step S126). The flow then returns to step S121 to load the next received signal C. If YES in step S125, a series of despreading processes end.

Figure 8:
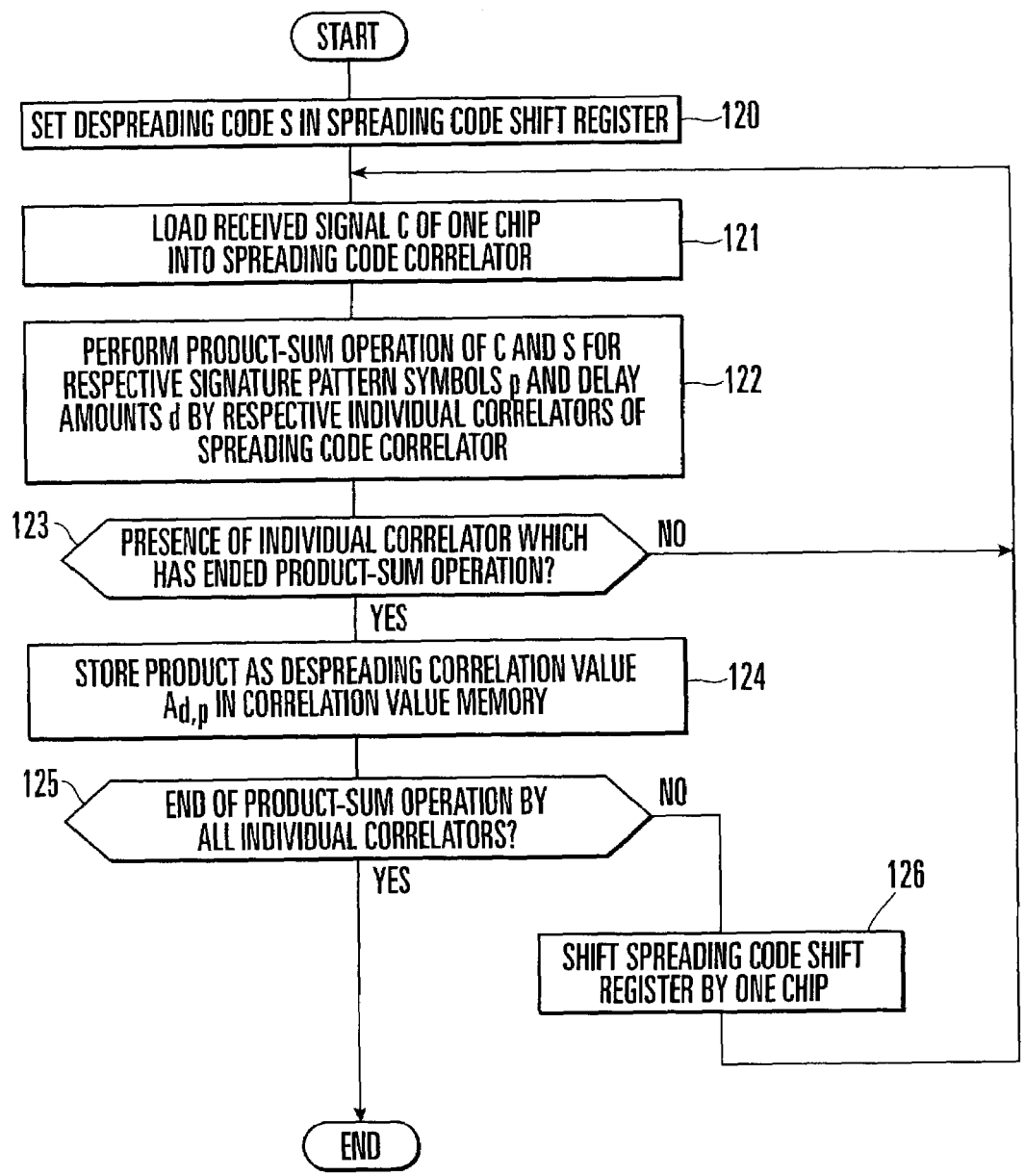
FIG. 8 is a flow chart showing despreading of the spreading code correlator shown in FIG. 7.

In this fashion, the spreading code correlator 3 calculates L spreading code correlation values A by one despreading shown in FIG. 8 for the received signal C serving as a reference. More specifically, the received signal C to be processed is shifted by one chip repetitively by K times from repetitive counts ###0 to ###K-1. As a result, the spreading code correlator 3 calculates all spreading code correlation values $A_{d,p}$ corresponding to the signature pattern symbols $U_p$ and delay amounts d for the received signal of one block #.

FIG. 9 shows the spreading code correlation value A calculated by each correlation bank and each correlator. Letting k be the correlation bank number, l be the correlator number, n be the repetitive count, d be the delay amount, and p be the signature pattern symbol number, the spreading code correlation value $A_{d,p}$ calculated by each correlator is given by $$A_{d,p} = \sum_{i=0}^{M/K-1} \{S^*_{(K \times i + K)} \times C_{(K \times (i+l) + n)}\} \quad (2)$$

where A, S, and C are complex numbers, and * is the complex conjugate.

The delay amount d is given by $$d = K \times l - k + n$$

For d<0, $$d = K \times (l+1) - k + n$$

For the delay amount d<0, the spreading code correlator 3 does not perform product-sum operation because this delay is negative with respect to the received signal C and calculation becomes invalid. Only for d?0, the spreading code correlator 3 performs product-sum operation.

Figure 10:
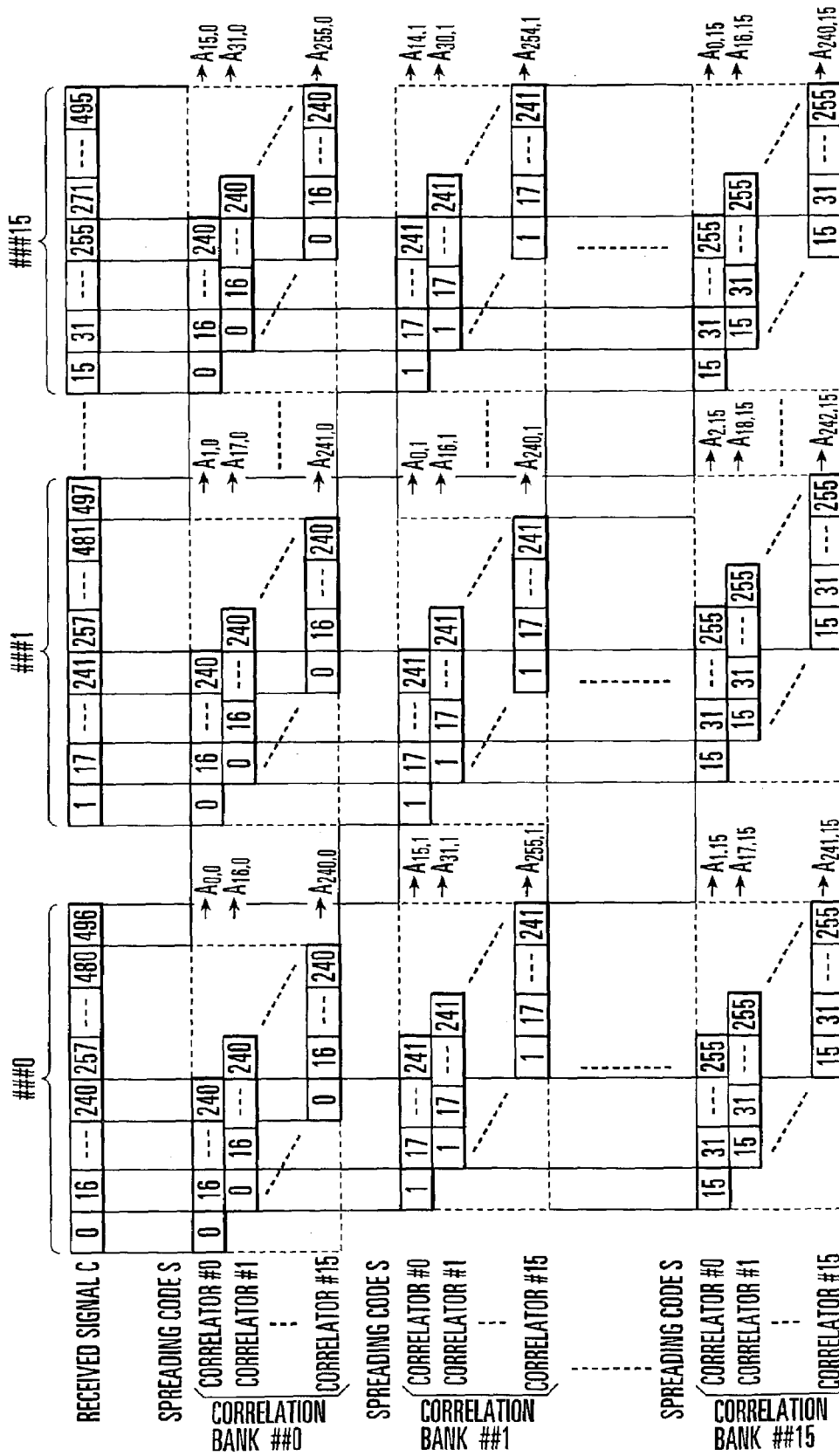
FIG. 10 is a view showing a detailed correspondence between a received signal and a spreading code.

FIG. 10 shows the correspondence between the received signal C and the spreading code S for K=16, M=256, and L=256.

For the repetitive count ###0 (n=0), $C_0, C_{16}, \ldots,$ and $C_{496}$ are sequentially read out as the received signal C from the received signal memory 1, and parallel-input to the correlators #0 to #15 of the correlation bank ##0. The spread shift register ##0 sequentially outputs spreading codes $S_0, S_{16}, \ldots, S_{496}$ corresponding to a signature pattern symbol $U_0$ (p=0) to be processed by the correlation bank ##0 to the correlators #0 to #15. The correlators #0 to #15 perform product-sum operation to calculate spreading code correlation values $A_{0,0}, A_{16,0}, \ldots$ and $A_{240,0}$.

The received signals $C_0, C_{16}, \ldots,$ and $C_{496}$ are also parallel-input to the correlators #0 to #15 of the correlation bank ##1. The correlators #0 to #15 perform product-sum operation of the received signals $C_0, C_{16}, \ldots,$ and $C_{496}$ by spreading codes $S_1, S_{17}, \ldots,$ and $S_{241}$ input from the spread shift register ##1 to calculate spreading code correlation values $A_{15,1}, A_{31,1}, \ldots,$ and $A_{255,1}$ corresponding to the delay amount d=1.

In this manner, the respective correlation banks simultaneously calculate spreading code correlation values A corresponding to different signature pattern symbols for the same received signal sequence $C_0, C_1, \ldots, C_{496}$. This processing is repeated up to the repetitive count ###15. All spreading code correlation values $A_{d,p}$ corresponding to respective signature pattern symbols $U_p$ and delay amounts d are calculated and sequentially stored in the correlation value memory 6. Accordingly, spreading code correlation values can be efficiently calculated by a relatively small number of correlators.

Figure 11:
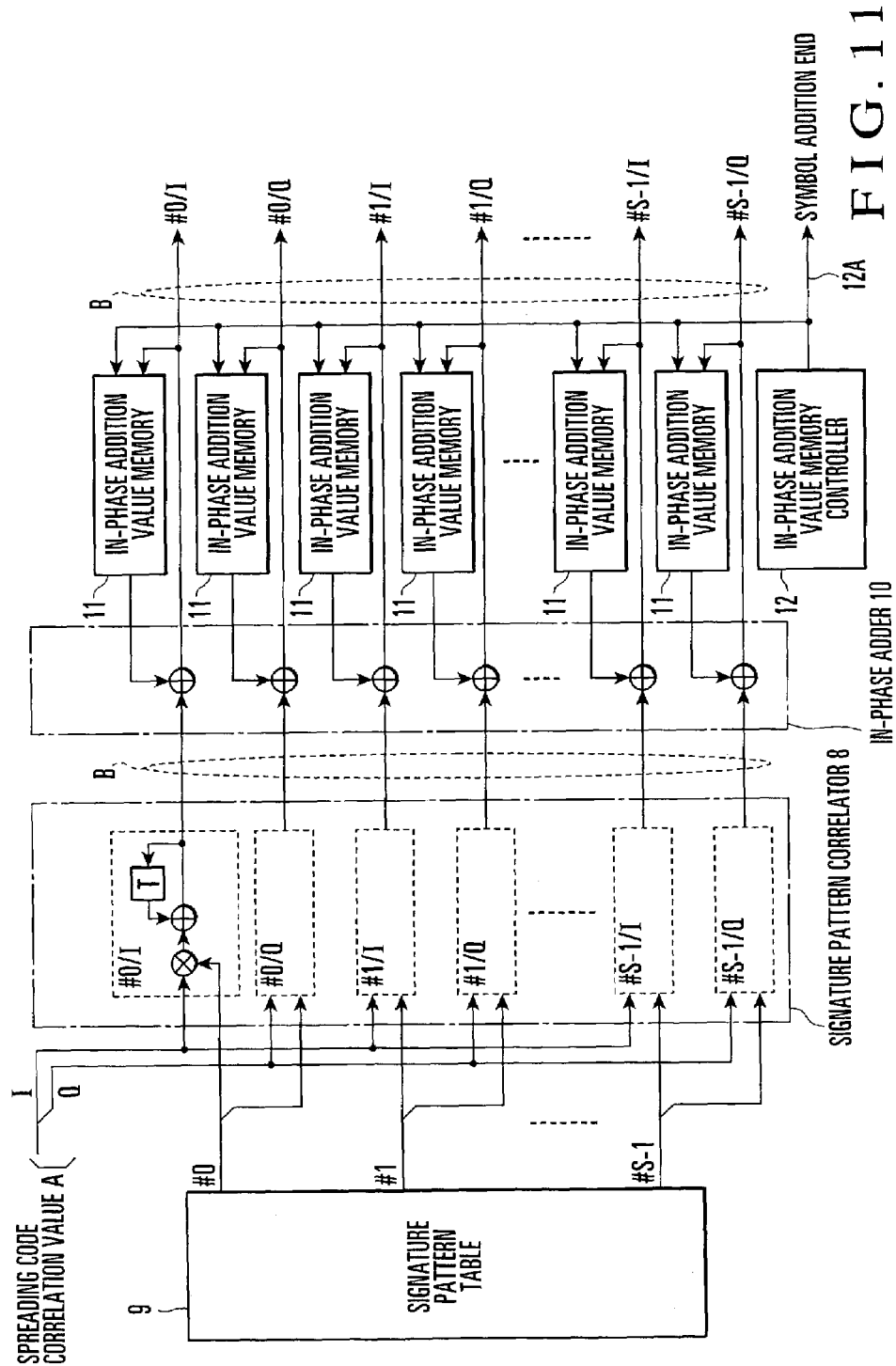
FIG. 11 is a diagram showing details of a signature pattern correlator, in-phase adder, and in-phase addition value memory shown in FIG. 1.

Details of the signature pattern correlator 8, in-phase adders 10, and in-phase addition value memories 11 will be explained with reference to FIG. 11. When a plurality of signature patterns-exist, S×2 correlators #0 to #S−1 are parallel-arranged for I and Q components in accordance with signature pattern types S, as shown in accordance with signature pattern types S, as shown in FIG. 11. This arrangement allows simultaneously detecting a plurality of signature patterns.

Of spreading code correlation values A stored in the correlation value memory 6, K spreading code correlation values $A_{d,0}, A_{d,1}, \ldots,$ and $A_{d,K-1}$ corresponding to the same delay amount d are read out and input to the correlators #0 to #S−1 in order of the signature pattern symbol number p. At this time, the spreading code correlation values $A_{d,p}$ are divided into I components as real parts and Q components as imaginary parts, which are respectively input to correlators #0/I and #0/Q to #S−1/I and #S−1/Q. Each correlator performs product-sum operation with a signature pattern for the respective I and Q components to calculate a signature pattern correlation value B. Letting SigNo be the signature pattern type number and b be the number of the block # of the received signal, a signature pattern correlation value $B_{SigNo,d,b}$ is given by $$B_{SigNo,d,b} = \sum_{p=0}^{K-1} \{U^*_{SigNo,p} \times A_{d,p}\} \quad (3)$$

The in-phase adders 10 and in-phase addition value memories 11 are arranged in correspondence with the respective correlators, i.e., signature pattern correlation values B of the signature pattern correlator 8. In the example of FIG. 11, S×2 in-phase adders 10 and S×2 in-phase addition value memories 11 are types S and the I and Q components. Each pair of the in-phase adder 10 and in-phase addition value memory 11 calculates an in-phase addition value B', and in-phase addition is executed repetitively by a predetermined number of blocks #. Signature pattern correlation values can be efficiently parallel-calculated by a relatively small number of correlators for a plurality of types of signature patterns.

Figure 12:
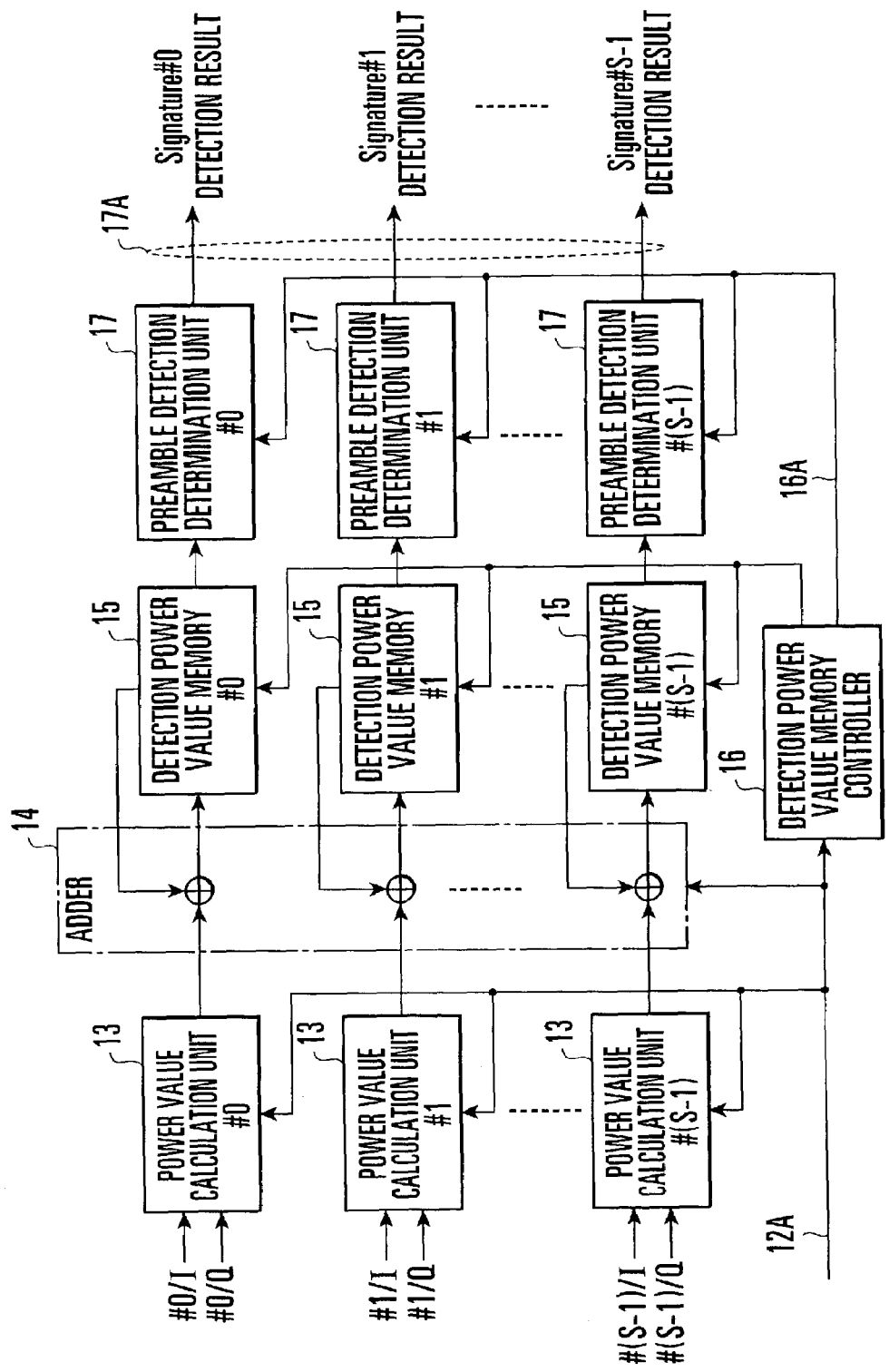
FIG. 12 is a block diagram for explaining details of a power value calculation unit, adder, detection power value memory, and preamble detection determination unit.
Figure 13:
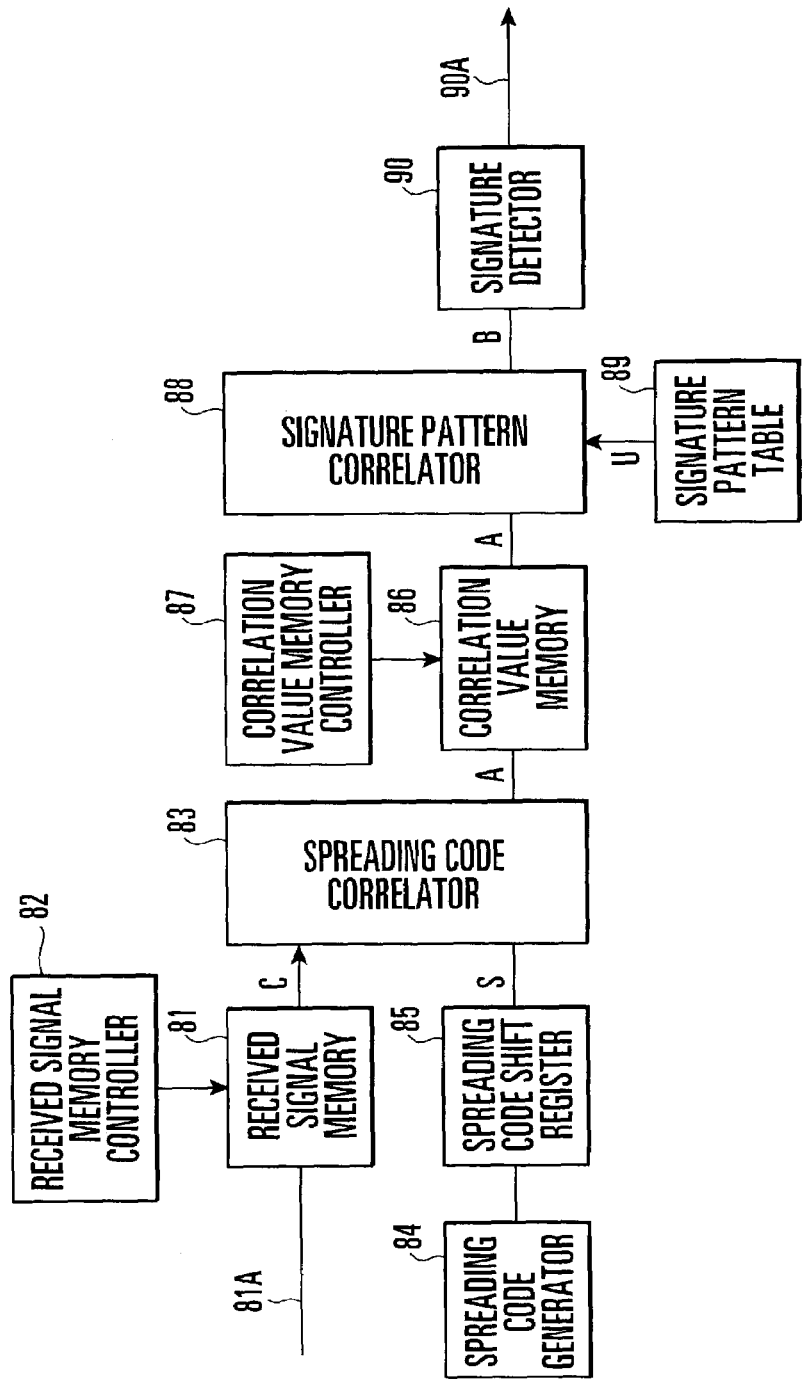
FIG. 13 is a block diagram showing a conventional fixed pattern detection apparatus.

Details of the power value calculation units 13, adders 14, detection power value memories 15, and preamble detection determination units 17 will be described with reference to FIG. 12. S power value calculation units 13, S adders 14, S detection power value memories 15, and S preamble detection determination units 17 are arranged for respective signature pattern types.

Each power value calculation unit 13 calculates an individual power value $P = I_2 + Q_2$ from the I and Q components of the in-phase addition value B' every signature pattern type on the basis of a symbol addition end signal 12A output from the in-phase addition value memory controller 12 after the in-phase addition value B' is repeated by a predetermined number of blocks #. The calculation result is stored in the detection power value memory 15. The adder 14 adds the individual power value P from the power value calculation unit 13 and the calculated detection power value P' read out from the detection power value memory 15 every signature pattern type. This operation is repeated until detection power values P' corresponding to the fixed pattern length N are added.

The above operation is repetitively executed for the indefinite time width L by the oversampling count, calculating detection power values P'. When a predetermined number of detection power values P' or more are calculated, the detection power value memory controller 16 outputs a determination signal 16A. In accordance with the determination signal 16A, the preamble detection determination unit 17 compares the maximum one of the detection power values P' stored in the detection power value memory 15 with a threshold every signature pattern type. Based on the comparison result, the preamble detection determination unit 17 determines every signature pattern type whether the signature pattern has been detected.

The above embodiment has exemplified a case where a preamble signal of PRACH (Physical Random Access CHannel) defined by the mobile communication system standard by the 3rd generation mobile communication system standardization project 3GPP is detected as a fixed pattern. The fixed pattern to be processed is not limited to this. For example, in 3GPP, an access preamble signal and CD preamble signal of PCPCH (Physical Common Packet CHannel) also have the same structure as that of PRACH, and the present invention can be applied to these signals similarly to the above-described embodiment.

As has been described above, according to the present invention, a received signal is divided into a plurality of blocks #. The received signals of the respective blocks # undergo product-sum operation using spreading codes by the spreading code correlators to obtain spreading code correlation values. The obtained spreading code correlation values undergo product-sum operation using signature patterns by the signature pattern correlators. Signature pattern correlation values obtained for respective blocks # are added in phase by the in-phase adders every plurality of blocks #. Individual power values are calculated by the power value calculation units from in-phase addition values obtained from the signature pattern correlation values. The individual power values are summed up into a desired detection power value.

The received signal is hardly influenced by phase inversion caused by the frequency drift of the received signal, compared to a case where correlation products undergo despreading at once for an N-chip fixed pattern length. Degradation of the reception characteristic can be suppressed, and a fixed pattern can be stably detected.

What is claimed is:

1. A fixed pattern detection apparatus which is used in a CDMA communication radio reception apparatus, and detects from a received signal a fixed pattern generated by spreading by a spreading code an in-phase component and a quadrature component of a pattern obtained by repeating a signature pattern formed from a plurality of symbols, comprising:
    a reception memory which temporarily stores received signals;
    correlation means for calculating signature pattern correlation values for respective blocks by product-sum operation based on received signals of the respective blocks obtained by dividing a received signal at a predetermined reference timing out of the received signals stored in said reception memory;
    in-phase addition means for adding, in phase for a plurality of blocks, in-phase components and quadrature components of the signature pattern correlation values obtained by said correlation means;
    power value calculation means for calculating individual power values from in-phase addition values obtained by said in-phase addition means;
    addition means for summing up the individual power values obtained by said power value calculation means to calculate a detection power value corresponding to the received signal; and
    detection determination means for comparing the detection power value obtained by said addition means with a threshold to determine whether a fixed pattern has been detected.

2. An apparatus according to claim 1, wherein said correlation means comprises correlators which separately perform product-sum operation of the received signals of the respective blocks to calculate signature pattern correlation values for the respective blocks.

3. An apparatus according to claim 1, wherein said correlation means comprises
    a spreading code correlator which calculates spreading code correlation values of the respective blocks by calculating a sum of products of the received signals of the respective blocks and parts of spreading codes corresponding to the respective blocks for the received signals of the respective blocks obtained by dividing the received signal at the predetermined reference timing out of the received signals stored in said reception memory, and
    a signature pattern correlator which calculates signature pattern correlation values of the respective blocks by calculating a sum of products of the spreading code correlation values of the respective blocks and the signature pattern for the spreading code correlation values of the respective blocks obtained by said spreading code correlator.

4. An apparatus according to claim 1, wherein
said reception memory stores a received signal containing a fixed pattern generated by spreading by a K×M-chip long spreading code an in-phase component and a quadrature component of a K×M-chip long pattern obtained by repeating M times (M is an integer of not less than 2) a signature pattern formed from K (K is an integer of not less than 2) symbols, and said correlation means comprises
a spreading code correlator which calculates spreading code correlation values of the respective blocks by calculating a sum of products of received signals of the respective blocks and parts of spreading codes corresponding to the respective blocks for the received signals of the respective blocks obtained by dividing a (K×M)-chip long received signal at the predetermined reference timing out of the received signals stored in said reception memory, and a signature pattern correlator which calculates signature pattern correlation values of the respective blocks by calculating a sum of products of the spreading code correlation values of the respective blocks and the signature pattern for the spreading code correlation values of the respective blocks obtained by said spreading code correlator.

5. An apparatus according to claim 4, wherein
an indefinite range where the fixed pattern contained in the received signal from the reference timing exists corresponds to L chips (L is an integer of not less than 2 divisible by K), and spreading code correlation values are calculated for respective received signals delayed from the reference timing within a range of 0 to L chips, said spreading code correlator comprises K correlation banks which parallel-receive received signals sequentially read out from said reception memory and separately calculate spreading code correlation values corresponding to respective symbols of the signature pattern from the received signals, and each of said correlation banks comprises L/K correlators which parallel-receive received signals sequentially read out from said reception memory and separately calculate spreading code correlation values containing a predetermined delay amount for a symbol corresponding to said each correlation bank.

6. An apparatus according to claim 5, wherein in said correlator, letting k be a number of said correlation bank, l be a number of said correlator, n be a repetitive processing count of loading and processing a received signal of a block with a shift of one chip, d be a delay amount from the reference timing to the received signal, p be a symbol number of the signature pattern, $C_0, C_1, \ldots$ (C is a complex number) be received signals, and $S^*_0, S^*_1, \ldots$ (S is a complex number and * is a complex conjugate) be spreading codes, a spreading code correlation value $A_{d,p}$ is calculated by $$C_n = S_n \cdot \sum_{i=0}^{M} U_{(n-K \times i)}$$

the delay amount d is given by delay amount $d = K \times l - k + n$ for d<0, delay amount $d = K \times (l+1) - k + n$.

7. An apparatus according to claim 5, further comprising a plurality of spreading code shift registers which are arranged for said respective correlation banks, and supply, to said correlators of said correlation banks with a delay every read of received signals, spreading codes of symbols corresponding to said respective correlation banks out of parts of spreading codes corresponding to the respective blocks.

8. An apparatus according to claim 4, wherein signature pattern correlation values are calculated for a plurality of types of signature patterns for the spreading code correlation values calculated by said spreading code correlator, and said signature pattern correlator comprises a plurality of correlators which are arranged for the plurality of types of signature patterns, parallel-receive the spreading code correlation values of the respective blocks for the spreading code correlation values of the respective blocks obtained by said spreading code correlator, and receive parts of assigned signature patterns corresponding to the respective blocks.

9. An apparatus according to claim 8, wherein in said correlator, letting SigNo be a type number of the signature pattern, p be a symbol number of the signature pattern, d be a delay amount of a received signal to which a spreading code correlation value is obtained, b be a block number, $A_{d,p}$ (A is a complex number) be a spreading code correlation value, and $U^*_{SigNo,0}$, $U^*_{SigNo,1}$, ... (U is a complex number and * is a complex conjugate) be a signature pattern, a signature pattern correlation value $B_{SigNo,d,b}$ is calculated by $$B_{SigNo,d,b} = \sum_{p=0}^{K-1} \{U^*_{SigNo,p} \times A_{d,p}\}.$$

10. An apparatus according to claim 1, wherein said reception memory, said correlation means, said power value calculation means, said addition means, and said detection determination means are arranged in a radio base station.

11. An apparatus according to claim 1, wherein said reception memory, said correlation means, said power value calculation means, said addition means, and said detection determination means are arranged in a radio mobile station.

12. A fixed pattern detection method which is used in a CDMA communication radio reception apparatus to detect from a received signal a fixed pattern generated by spreading by a spreading code an in-phase component and a quadrature component of a pattern obtained by repeating a signature pattern formed from a plurality of symbols, comprising the steps of:

temporarily storing received signals;

calculating signature pattern correlation values for respective blocks by product-sum operation based on received signals of the respective blocks obtained by dividing a received signal at a predetermined reference timing out of the stored received signals;

adding, in phase for a plurality of blocks, in-phase components and quadrature components of the obtained signature pattern correlation values;

calculating individual power values from obtained in-phase addition values;

summing up the obtained individual power values to calculate a detection power value corresponding to the received signal; and comparing the obtained detection power value with a threshold to determine whether a fixed pattern has been detected.

13. A method according to claim 12, wherein the step of calculating signature pattern correlation values comprises the step of separately performing product-sum operation of the received signals of the respective blocks to calculate signature pattern correlation values for the respective blocks.

14. A method according to claim 12, wherein the step of calculating signature pattern correlation values comprises the steps of calculating spreading code correlation values of the respective blocks by calculating a sum of products of the received signals of the respective blocks and parts of spreading codes corresponding to the respective blocks for the received signals of the respective blocks obtained by dividing the received signal at the predetermined reference timing out of the stored received signals, and calculating signature pattern correlation values of the respective blocks by calculating a sum of products of the spreading code correlation values of the respective blocks and the signature pattern for the spreading code correlation values of the respective blocks.

15. A method according to claim 12, wherein the storing step comprises the step of storing a received signal containing a fixed pattern generated by spreading by a K×M-chip long spreading code an in-phase component and a quadrature component of a K×M-chip long pattern obtained by repeating M times (M is an integer of not less than 2) a signature pattern formed from K (K is an integer of not less than 2) symbols, and the step of calculating signature pattern correlation values comprises the steps of calculating spreading code correlation values of the respective blocks by calculating a sum of products of received signals of the respective blocks and parts of spreading codes corresponding to the respective blocks for the received signals of the respective blocks obtained by dividing a (K×M)-chip long received signal at the predetermined reference timing out of the stored received signals, and calculating signature pattern correlation values of the respective blocks by calculating a sum of products of the spreading code correlation values of the respective blocks and the signature pattern for the spreading code correlation values of the respective blocks.

16. A method according to claim 15, wherein when an indefinite range where the fixed pattern may exist in the received signal from the reference timing corresponds to L chips (L is an integer of not less than 2 divisible by K), and spreading code correlation values are calculated for respective received signals delayed from the reference timing within a range of 0 to L chips, the step of calculating spreading code correlation values comprises the step of calculating spreading code correlation values for respective symbols of the signature pattern and respective delay amounts from the reference timing to the received signal by using K correlation banks each having L/K correlators which parallel-receive sequentially read received signals.

17. A method according to claim 16, wherein in the correlator, letting k be a number of the correlation bank, l be a number of the correlator, n be a repetitive processing count of loading and processing a received signal of a block with a shift of one chip, d be a delay amount from the reference timing to the received signal, p be a symbol number of the signature pattern, $C_0, C_1, \ldots$ (C is a complex number) be received signals, and $S^*_0, S^*_1, \ldots$ (S is a complex number and * is a complex conjugate) be spreading codes, a spreading code correlation value $A_{d,p}$ is calculated by $$C_n = S_n \cdot \sum_{i=0}^{M} U_{(n-K \times i)}$$

the delay amount d is given by delay amount $d = K \times l - k + n$ for d<0, delay amount $d = K \times (l+1) - k + n$.

18. A method according to claim 15, wherein when signature pattern correlation values are calculated for a plurality of signature patterns for the calculated spreading code correlation values, the step of calculating signature pattern correlation values comprises the step of calculating signature pattern correlation values for the respective signature patterns by using a plurality of correlators which are arranged for the respective signature patterns and parallel-receive the obtained spreading code correlation values of the respective blocks.

19. A method according to claim 18, wherein in the correlator, letting SigNo be a type number of the signature pattern, p be a symbol number of the signature pattern, d be a delay amount of a received signal to which a spreading code correlation value is obtained, b be a block number, $A_{d,p}$ (A is a complex number) be a spreading code correlation value, and $U^*_{SigNo,0}, U^*_{SigNo,1}, \ldots$ (U is a complex number and * is a complex conjugate) be a signature pattern, a signature pattern correlation value $B_{SigNo,d,b}$ is calculated by $$B_{SigNo,d,b} = \sum_{p=0}^{K-1} \{U^*_{SigNo,p} \times A_{d,p}\}.$$

* * * * *